United States Patent
Okano

[11] Patent Number: 5,842,052
[45] Date of Patent: Nov. 24, 1998

[54] LOCKING MECHANISM FOR A CAMERA VIBRATION CORRECTION DEVICE

[75] Inventor: Hiroshi Okano, Tokyo, Japan

[73] Assignee: Nikon Corporation, Tokyo, Japan

[21] Appl. No.: 688,054

[22] Filed: Jul. 31, 1996

Related U.S. Application Data

[63] Continuation of Ser. No. 527,502, Sep. 13, 1995, abandoned, which is a continuation of Ser. No. 379,023, Jan. 27, 1995, abandoned, which is a continuation of Ser. No. 223,975, Apr. 6, 1994, abandoned.

[30] Foreign Application Priority Data

Apr. 6, 1993 [JP] Japan ................................ 5-103465

[51] Int. Cl.⁶ .................................................. G03B 17/42
[52] U.S. Cl. .................................................. 396/55
[58] Field of Search ............................... 396/13, 52, 53, 396/54, 55, 529, 531, 532

[56] References Cited

U.S. PATENT DOCUMENTS

| | | | |
|---|---|---|---|
| 4,051,495 | 9/1977 | Rentschler et al. | 354/152 |
| 4,290,684 | 9/1981 | Hines | 354/286 |
| 4,939,532 | 7/1990 | Takebayashi | 354/286 |
| 5,117,246 | 5/1992 | Takahashi et al. | 354/202 |
| 5,153,635 | 10/1992 | Otani | 354/430 |
| 5,181,056 | 1/1993 | Noguchi et al. | 354/70 |

FOREIGN PATENT DOCUMENTS

| | | |
|---|---|---|
| 4132860 | 4/1992 | Germany . |
| 60-201328 | 10/1985 | Japan . |

*Primary Examiner*—Safet Metjahic
*Assistant Examiner*—Nicholas T. Tuccillo

[57] ABSTRACT

A camera with a locking mechanism for a vibration correction device in the camera. The camera includes a photographic optical system having a blur correction lens and is detachable from the camera body, a blur correction mechanism which moves the blur correction lens, a locking mechanism which has a first position that restricts the movement of the blur correction lens and a second position which allows the blur correction lens to move unrestricted by the locking mechanism, and a removal regulation member which regulates the detachment of the photographic optical system from the camera body, wherein the operation of the removal regulation member is conditional upon the position of the locking mechanism. The movement of the blur correction lens is restricted when the photographic optical system is detached from the camera body, thereby preventing damage to the blur correction lens, the photographic optical system, or other camera components.

16 Claims, 4 Drawing Sheets

LOCKING MECHANISM FOR A CAMERA VIBRATION CORRECTION DEVICE

This application is a continuation of U.S. application Ser. No. 08/527,502, filed Sep. 13, 1995, now abandoned, which is, in turn, a continuation of patent application Ser. No. 08/379,023, filed Jan. 27, 1995, now abandoned, which is, in turn, a continuation of Ser. No. 08/223,975 filed Apr. 6, 1994, now abandoned.

BACKGROUND OF THE INVENTION

1. Field of the Invention

The present invention relates to a locking mechanism for a camera vibration correction device which detects blurring that occurs during photographic exposure.

2. Description of the Related Art

Photograph blurring often occurs when manually photographing a subject. Generally, such blurring is most pronounced in cases where a lens of long focal length is used and cases where the shutter speed is slowed. Blurring usually results in damage to the picture quality of the photograph. Various types of vibration correction devices have been proposed to prevent blurring.

The general configuration of a typical vibration correction device comprises a detection mechanism which includes an angular speed gauge for detecting the manual blurring of the camera, a correcting optical mechanism which corrects for blurring by moving at least a part of the photographic optical system, a blur correcting mechanism which drives the correcting optical mechanism, and a control mechanism which controls the operation of the blur correcting mechanism. The correcting optical mechanism is driven according to detection results of a detection mechanism, thereby correcting for any blurring effect.

The relation between the inclined angular speed of the camera and image blurring is explained with reference to FIG. 1. The distance from lens L to object A equals a. The distance from lens L to the image formation surface equals b. The focal distance of lens L equals f. An image formation formula yields the following relationship:

$$(1/a)+(1/b)=(1/f)$$

If optical axis I is inclined to optical axis I' at angular speed $\omega 1$, the speed v1 at which the image works on the image formation surface becomes:

$$v1=(a \times f \times \omega 1)/(a-f)$$

If the shutter time, in seconds, equals t, the image blurring amount d1 is expressed as:

$$d1=v1 \times t$$

If this image blurring amount d1 is, for example, less than the circle of least confusion k (k=1/30 mm for 35 mm film), no substantial blurring occurs. If d1 is greater than k, substantial blurring occurs. If the blurring tolerance value is set to the circle of least confusion k, the maximum blurring angular speed $\omega 2$ which can be tolerated can be calculated from the following formula:

$$\omega 2=\delta(a-f)/aft$$

In the case where the blur correcting mechanism operates, if the image speed at the image formation surface based solely on the blur correcting mechanism is v2, the image blurring amount d2 (which contains manual blurring) becomes:

$$d2=(v1-v2) \times t$$

Since no blurring problem occurs if this image blurring amount d2 is less than the circle of least confusion k, the blur correcting mechanism is controlled according to output from the detection mechanism. In this manner, effective blur correction can be conducted if the value of (v1−v2) is kept to the minimum.

However, there is a danger of collision between the correcting optical mechanism and adjacent parts when the correcting optical mechanism inadvertently moves while the camera is being carried. Therefore, when blur correction is not conducted by a vibration isolator, it is desirable to restrict the blur correcting mechanism.

In Japanese Laid Open Patent Publication 4-110835, a device is proposed in which a locking mechanism is provided in order to restrict the movement of the blur correcting mechanism. Operation is made conditional upon the changes in status of a preparatory photographing operation start switch and a photographing operation start switch which respond to the release button. In this manner, the release button controls locking and lock release of the locking mechanism. This device is configured so that when the preparatory photographing operation start switch is turned ON, lock release (the blur correcting mechanism is not restricted) is conducted, and when the photographing operation start switch is turned ON and the photographing operation terminates, locking (the blur correction mechanism is restricted) is conducted.

This device, however, presents problems when adapted to a single lens reflex camera or similar type photo-optical system. With a single lens reflex camera adapted with the device, if the release button is mistakenly pushed when removing the exchange lens from the camera body, the blur correcting mechanism is removed from the camera body in a lock release condition. As a result, damage to the lens system, the blur correcting mechanism or other camera components can occur.

SUMMARY OF THE INVENTION

It is therefore an object of the present invention to provide a camera having a vibration correction device which minimizes possible damage to the camera caused when removing an exchange lens from the camera body.

It is an additional object of the present invention to provide a camera having a vibration correction device which is configured so that a blur correction mechanism is removed in a restricted condition when removing the exchange lens from the camera body.

Additional objects and advantages of the invention will be set forth in part in the description which follows and, in part, will be obvious from the description, or may be learned by practice of the invention.

The foregoing objects of the present invention are achieved by providing a camera which includes a camera body, a photographic optical system which includes a blur correction lens and is detachable for the camera body, a blur correction mechanism which compensates for blur by moving the blur correction lens, a locking mechanism which has a first position that restricts movement of the blur correction lens and a second position which allows the blur correction lens to move unrestricted by the locking mechanism, and a removal regulation member which regulates the detachment of the photographic optical system from the camera body, wherein the operation of the removal regulation member is conditional upon the position of the locking mechanism.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 2:
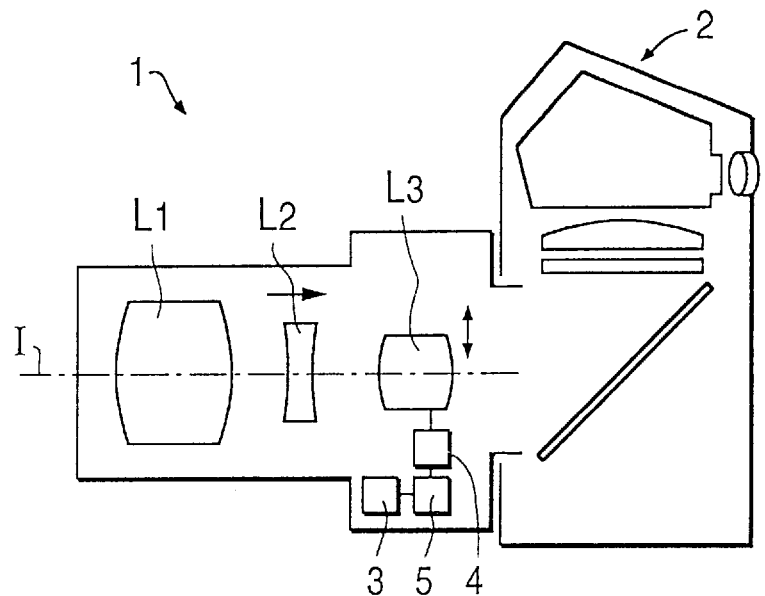
FIG. 2 is a block diagram of a first embodiment of a vibration correction device for a camera of the present invention.

Reference will now be made in detail to the present preferred embodiments of the present invention, examples of which are illustrated in the accompanying drawings, wherein like reference numerals refer to like elements throughout. Referring in particular to FIG. 2, this figure is a block diagram illustrating a first embodiment of a vibration correction device for a camera of an embodiment of the present invention. The camera is a single lens reflex ("SLR") camera provided with exchange lens 1 and camera body 2. The photographic optical system includes fixed lens group L1, focusing lens group L2 and blur correcting lens group L3. Focusing lens group L2 moves in the optical axis I direction and governs focusing of the photographic optical system. Blur correcting lens group L3 moves in an orthogonal direction relative to the optical axis I and corrects the blurring of the camera. The photographic optical system, which includes fixed lens group L1, focusing lens group L2 and blur correcting lens group L3, is incorporated into exchange lens 1.

Blur detection mechanism 3 is comprised by a speed sensor (not illustrated) or angular speed sensor (not illustrated). A blur correcting mechanism 4 shifts blur correcting lens group L3 on a plane at right angles to the optical axis I. A blur control mechanism 5 stores lens information, including focal distance and information relating to blur correction. Blur detection mechanism 3, blur correcting mechanism 4 and blur control mechanism 5 are arranged inside exchange lens 1. Blur control mechanism 5 controls the blur correcting mechanism 4 and conducts blur correction based on internally stored information in blur control mechanism 5 and output from blur detection mechanism 3.

Figure 3:
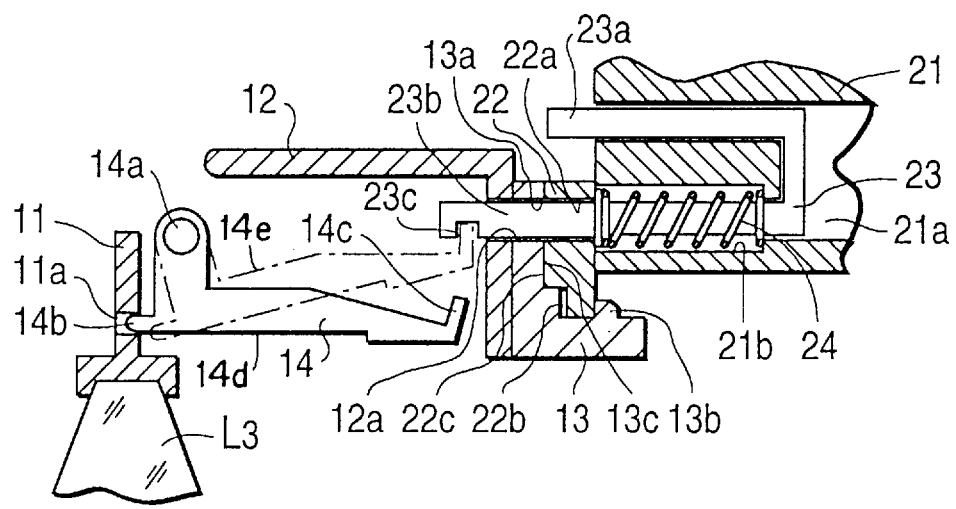
FIG. 3 is a block diagram of a locking mechanism of the vibration correction device for a camera as shown in FIG. 2 of an embodiment of the present invention.

FIG. 3 is a block diagram illustrating an enlarged portion of a locking mechanism which restricts the movement of blur correcting lens group L3 and the removal of exchange lens 1, according to an embodiment of the present invention. Blur correcting lens group L3 is held by lens holding member 11 so that blur correcting lens group L3 is capable of being shifted on a plane at right angles to the optical axis I by the control of blur correcting mechanism 4.

Exchange lens 1 also includes lens housing member 12. Lens mount member 13 is integrally attached at the end face of lens housing member 12, facing camera body 2. Lens mount member 13 is designed so that it removably engages by conventional bayonet mount connection with body mount member 22. Body mount member 22 is integrally attached to the end face of body housing member 21. Body housing member 21 forms camera body 2.

On the inside of body housing member 21, U-shaped removal regulation member 23 is contained in notched part 21a and long hole part 21b. One end (the manipulation part) 23a of removal regulation member 23 is in a state where it projects from the end face of body housing member 21, while the other end (the engagement part) 23b is in a state where it projects from hole 22a of body mount member 22. Regulation member 23 is energized by coil spring 24 installed inside long hole part 21b so that regulation member 23 projects outward (toward the left in FIG. 3).

In the embodiment of FIG. 3, exchange lens 1 and camera body 2 are connected. While connected in this manner, engagement part 23b of removal regulation member 23 passes through hole 13a of lens mount member 13 and hole 12a of lens housing member 12 and projects into exchange lens 1. Notched part 23c is positioned at the tip of engagement part 23b and is configured so as to engage with locking arm 14.

Locking arm 14 is installed inside exchange lens 1 and is configured to shift centering on fulcrum 14a with a motor (not illustrated) as a drive source. The motor moves locking arm 14 by rotating locking arm 14 on fulcrum 14a. Such motors and drive mechanisms are well-known in the art. Protrusion 14b of one end of locking arm 14 fits into hole 11a provided in lens holding member 11 and, when protrusion 14b is fitted into hole 11a, movement of holding member 11 is restricted. Protrusion 14c of the other end of locking arm 14 fits into notched part 23c of engagement part 23b and, when protrusion 14c is fitted into notched part 23c, movement of removal regulation member 23 is restricted. Therefore, locking arm 14 has two positions. In the first position 14d, indicated by solid lines 14d, protrusion 14b is fitted into hole 11a and protrusion 14c is not fitted into notched part 23c. When in the first position 14d, the movement of holding member 11 is restricted, removal regulation member 23 is not held in position, and extension lens 2 can be removed from camera body 2. When locking arm 14 is in the second position 14e, indicated by dashed lines 14e, protrusion 14c is fitted into notched part 23c and protrusion 14b is not fitted into hole 11a. Therefore, when in the second position 14e, holding member 11 is not restricted, removal regulation member 23 is held in position, and extension lens 1 cannot be removed from camera body 2. In this manner, correcting lens group L3 is protected by restricting the movement of holding member 11 when removing extension lens 1 from camera body 2. When correcting lens group L3 is allowed to function properly (that is, holding member 11 is not restricted), extension lens 1 cannot be removed from camera body 2.

Lens mount member 13 has claw parts 13b. Body mount member 22 has claw parts 22b. Surface 13c represents a surface of lens mount member 13 and surface 22c represents a surface of body mount member 22.

Figure 4A:
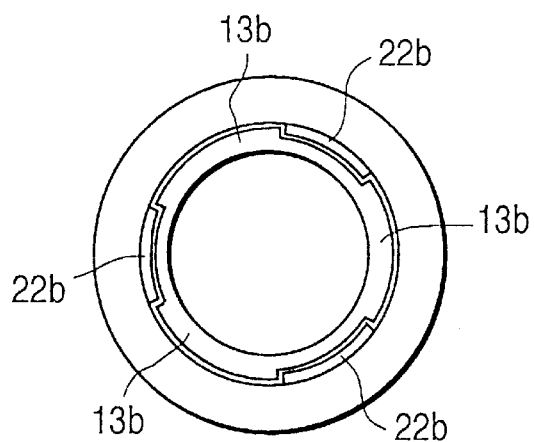
FIGS. 4(A) and 4(B) illustrate a configuration of an exchange lens and a camera body for a camera of an embodiment of the present invention.
Figure 4B:
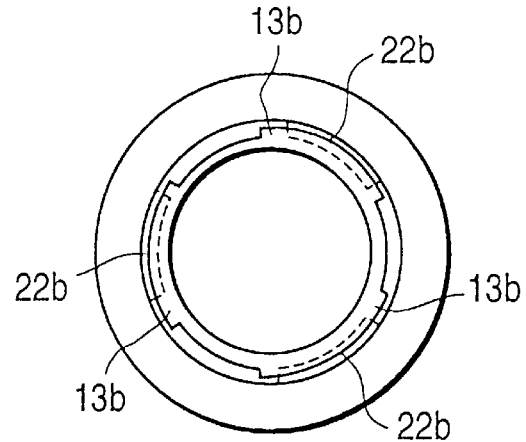

FIGS. 4(A) and 4(B) illustrate a connection between exchange lens 1 and camera body 2. FIG. 4(A) illustrates relative positions of exchange lens 1 and camera body 2 when exchange lens 1 is to be removed from, or to be attached to, camera body 2. FIG. 4(B) illustrates the relative positions of exchange lens 1 and camera body 2 when exchange lens 1 is attached to camera body 2.

When attaching exchange lens 1 to camera body 2, as shown in FIG. 4(A), exchange lens 1 is secured at an angle position where claw parts 13b of lens mount member 13 and claw parts 22b of body mount member 22 do not interfere with one another. Exchange lens 1 is pushed in until surface 13c of lens mount member 13 and surface 22c of body mount member 22 come into contact.

At this time, engagement part 23b of removal regulation member 23 is pushed by surface 13c, resulting from the contact between surface 13c and surface 22c, and engagement part 23b is moved back in opposition to coil spring 24 to a position unit engagement part 23b approximately reaches surface 22c. Exchange lens 1 is then rotated until the position where claw parts 13b and claw parts 22b catch. The position where a rotation limiting member (not illustrated) is contacted is considered as the catching position (lens installation position) of claw parts 13b and 22b.

Therefore, when the relative angle positions of lens mount member 13 and body mount member 22 have attained the lens installation position illustrated in FIG. 4(B), the engagement part 23b of removal regulation member 23 passes through hole 13a of lens mount member 13 and hole 12a of lens housing member 12, with the result that the relative turning of lens mount member 13 and body mount member 22 becomes impossible.

When exchange lens 1 is removed from camera body 2, manipulation part 23a of removal regulation member 23 is pushed inward in opposition to coil spring 24 and engagement part 23b is withdrawn from holes 12a and 13a. In this state, exchange lens 1 is rotated until an angle position between lens mount member 13 and body mount member 22 is reached where claw parts 13b and claw parts 22b do not interfere with one another. The position of contact with the rotation limiting member (not illustrated) is considered as the catching position (lens removal position) of claw parts 13b and 22b. If a photographer pulls out exchange lens 1 from camera body 2 in this state, exchange lens 1 can be removed.

Removal of exchange lens 1 from camera body 2 is conditional upon locking arm 14 being in the first position 14d (previously described) where protrusion 14c is disengaged from notched part 23c of removal regulation member 23 and protrusion 14b is inserted into hole 11a of lens holding member 11. Accordingly, exchange lens 1 can be removed from camera body 2 only when the movement of blur correcting mechanism 4 is restricted via the restriction of lens holding member 11.

Figure 5:
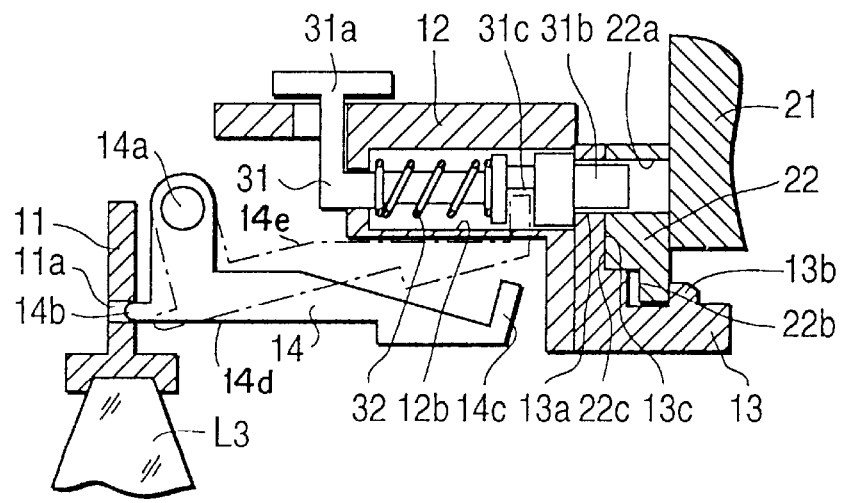
FIG. 5 is a block diagram of the locking mechanism of a vibration correction device for a camera of a second embodiment of the present invention.

FIG. 5 illustrates a locking mechanism for a vibration correction device of an additional embodiment of the present invention. Structures of the embodiment of FIG. 5 which are similar to structures of the embodiments of previous figures are provided with the same reference numerals and a repeated detailed explanation of the structures will be omitted.

In the embodiment of FIG. 5 for the camera of the present invention, an L-shaped removal regulation member 31 is provided inside exchange lens 1. One end (the manipulation part) 31a of removal regulation member 31 is in a state where manipulation part 31a projects out from the top surface of lens housing member 12, while the other end (engagement part) 31b is in a state where engagement part 31b projects toward camera body 2 side from hole 13a of lens mount member 13. Engagement part 31b is contained inside long hole 12b of lens housing member 12. Removal regulation member 31 is energized to project in the direction of camera body 2 (toward the right in FIG. 5) by coil spring 32 installed inside long hole 12b. Notched part 31c is provided in removal regulation member 31.

In a similar manner as described for the embodiment of the present invention in FIG. 3, the relation of locking arm 14 and removal regulation member 31 is configured so that the movement of removal regulation member 31 is restricted by the insertion of protrusion 14c of locking arm 14 into notched part 31c of removal regulation member 31.

In order to remove exchange lens 1 from camera body 2, a photographer can slide manipulation part 31a of removal regulation member 31 in opposition to coil spring 32 until a position is reached where engagement part 31b is withdrawn from hole 22b. The photographer then must turn exchange lens 1 to a lens removal position (as illustrated in FIG. 4(A)), and pull exchange lens 1 out from camera body 2.

Removing exchange lens 1 from camera body 2, however, is conditional upon protrusion 14c of locking arm 14 being disengaged from notched part 31c of removal regulation member 31, and protrusion 14b being inserted into hole 11a of lens holding member 11. Accordingly, in the embodiment of the present invention as illustrated in FIG. 5, exchange lens 1 can only be removed from camera body 2 in the state where the movement of the blur correcting mechanism 4 is restricted.

Therefore, similar to the embodiment of the present invention as described for FIG. 3, locking arm 14 has a first position 14d and a second position 14e. In the first position 14d, protrusion 14b is fitted into hole 11a to restrict the movement of holding member 11 and protrusion 14c is disengaged from notched part 31c. When locking arm 14 is in the first position 14d, blur correcting lens group L3 is restricted, removal regulation member 31 is not locked in position and, therefore, exchange lens 1 can be removed from camera body 2. When locking arm 14 is in the second position 14e, protrusion 14b is not fitted into hole 11a, protrusion 14c is engaged with notched part 31c and, therefore, blur correcting lens group L3 is not restricted and exchange lens 1 cannot be removed from camera body 2.

Figure 6:
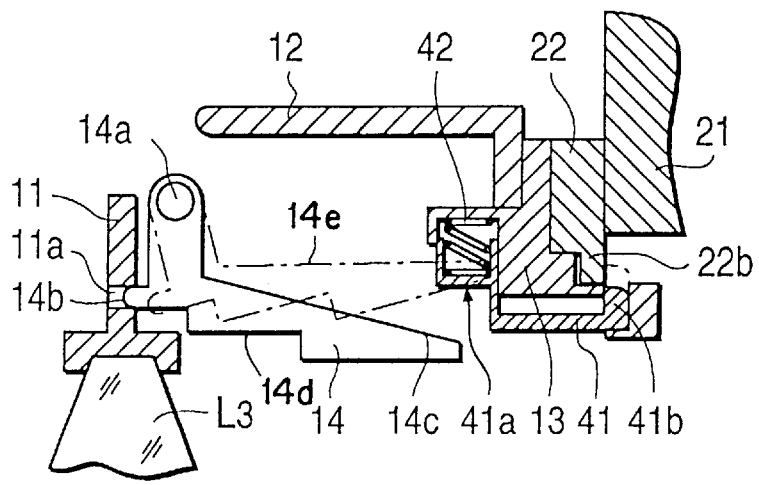
FIG. 6 is a block diagram of a locking mechanism of a vibration correction device for a camera of a third embodiment of the present invention.

FIG. 6 illustrates a locking mechanism of a further embodiment of the present invention. Structures for the embodiment of FIG. 6 which are similar to structures for the embodiments in the previous figures are provided with the same reference numerals and a repeated detailed explanation of the structures will be omitted.

In the embodiment of the present invention as illustrated in FIG. 6, removal regulation member 41 is attached so that it is capable of sliding in a radial direction relative to lens mount member 13 at the inner periphery end of lens mount member 13, and removal regulation member 41 is constantly energized in the radial direction (the downward direction in FIG. 6) by coil spring 42 installed inside lens mount member 13.

Locking arm 14 shifts centering on fulcrum 14a and, when in the first position 14d, restricts the movement of lens holding member 11 by the insertion of protrusion 14b into hole 11a of holding member 11. By pushing up on bottom face 41a of removal regulation member 41 when locking arm 14 is in the second position 14e, protrusion 14c causes movable claw part 41b to engage with claw part 22b of body mount member 22.

Figure 7A:
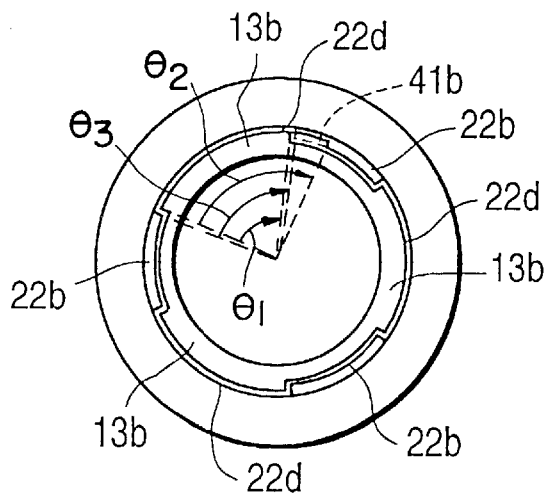
FIGS. 7(A) and 7(B) illustrate a configuration of an exchange lens and a camera body for a camera of an embodiment of the present invention.
Figure 7B:
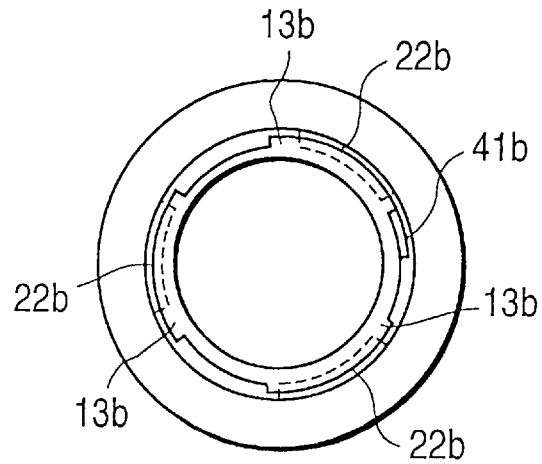

The connection between exchange lens 1 and camera body 2 is now explained with reference to FIGS. 7(A) and 7(B). In both FIGS. 7(A) and 7(B), claw part 41b protrudes into notched part 22d of body mount member 22, thereby preventing the removal of exchange lens 1 from camera body 2. FIG. 7(A) illustrates a state where exchange lens 1 is attached to camera body without any rotation between exchange lens 1 and camera body 2. FIG. 7(B) illustrates a state where exchange lens is attached to camera body 2 and exchange lens 1 and camera body 2 are rotated with respect to each other.

In FIG. 7(A), $\theta_1$ represents the angle of claw parts 13b, $\theta_2$ represents the angle of one of the claw parts 13b combined with movable claw part 41b, and $\theta_3$ represents the angle of notched parts 22d. In FIG. 7(A), $\theta_2$ is larger than $\theta_3$, therefore, exchange lens 1 cannot be removed from camera body 2. Accordingly, exchange lens 1 can only be removed from camera body 2 when locking arm 14 is in the second position 14e. When locking arm 14 is in the second position 14e, movable claw part 41b is disengaged from claw part 22b and protrusion 14b of locking arm 14 is inserted into hole 11a of lens holding member 11.

A still further embodiment of the present invention is described with reference to FIG. 8. Structures for the embodiment of FIG. 8 which are similar to structures for the embodiments in the previous figures are provided with the same reference numerals and a repeated detailed explanation of the structures will be omitted.

Figure 8:
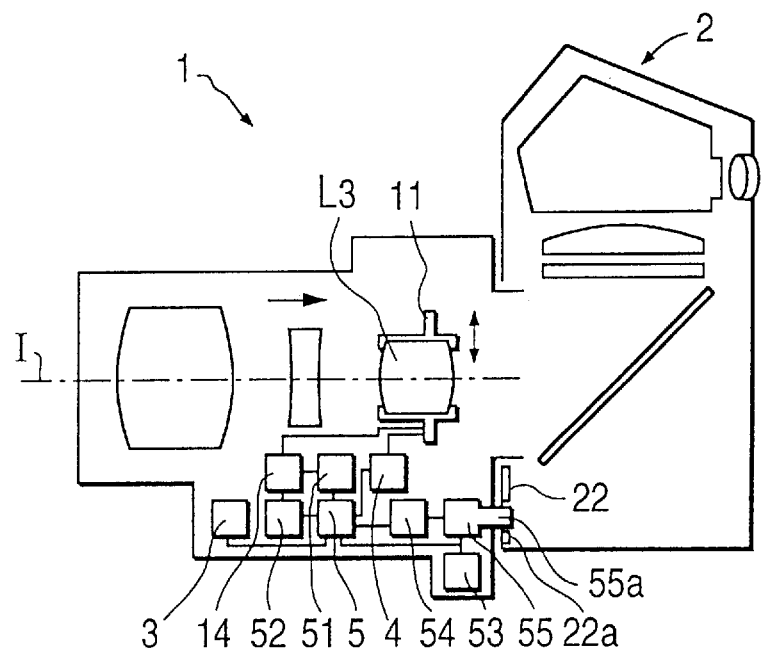
FIG. 8 is block diagram which illustrates a fourth embodiment of a vibration correction device for a camera of the present invention.
Figure 1:
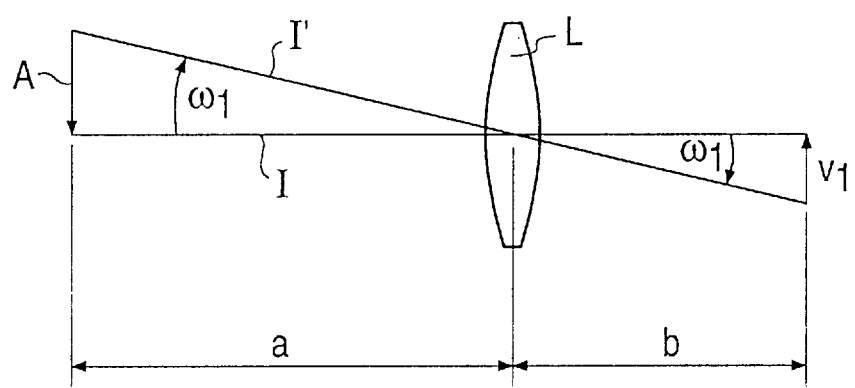
FIG. 1 is an illustration of the relationship between manual blurring and image blurring.

In the embodiment of the present invention as shown in FIG. 8, locking arm 14 possesses a configuration of either of the previously described embodiments of the present invention. Therefore, locking arm 14 is capable of being moved to a position (first position 14d) where it engages with holding member 11 and the driving of the blur correcting mechanism 4 is restricted, and to the position (second position 14e) where locking arm 14 disengages from holding member 11 and the driving of the blur correcting mechanism 4 is not restricted. Locking arm 14 is driven by lock drive mechanism 51 comprising a motor (not illustrated) and gear array (not illustrated). Lock discrimination mechanism 52, comprising switches (not illustrated), discriminates whether locking arm 14 is in a locked state or a lock release state.

Operation member 53 operates as a switch. Removal drive mechanism 54, comprising a motor (not illustrated) and gear array (not illustrated), is activated when a photographer manipulates operation member 53. Such drive mechanisms are wellknown in the art. By activating operation member 53, sliding pin 55a of removal regulation member 55 is moved between a projecting position which engages with hole 22a of body mount member 22 and a withdrawal position which disengages from hole 22a of body mount member 22.

In order to remove exchange lens 1 from camera body 2, operation member 53 is turned ON and the locking state is confirmed by lock discrimination mechanism 52. When the locking state is ON (locked state), blur control mechanism 5 controls removal drive mechanism 54, thereby driving sliding pin 55a of removal regulation member 55 to the withdrawal position. As a result, the rotation of exchange lens 1 becomes possible and exchange lens 1 can be removed from camera body 2.

When the locking state is OFF (lock release state), blur control mechanism 5 does not drive removal drive mechanism 54, and sliding pin 55a of removal regulation member 55 is held in the projecting position. As a result, the rotation of exchange lens 1 becomes impossible and exchange lens 1 cannot be removed from camera body 2.

Next, as shown in FIG. 8 and as described below, there is provided a camera having a locking mechanism which comprises the configuration of FIG. 5. In this embodiment of the present invention, in order to remove exchange lens 1 from camera body 2, operation member 53 is turned ON, and the locking state is confirmed by lock discrimination mechanism 52. When the locking state is ON (locked state), blur control mechanism 5 controls removal drive mechanism 54 and sliding pin 55a of removal regulation member 55 is driven to the withdrawal position. As a result, the rotation of exchange lens 1 becomes possible and exchange lens 1 can be removed from camera body 2.

When the locking state is OFF (lock release state), blur control mechanism 5 controls blur correcting mechanism 4 and, after driving lens holding member 11 to a specified lock position, blur control mechanism 5 drives locking arm 14 and the driving of blur correcting mechanism 4 is restricted. After the locking state is confirmed by lock discrimination mechanism 52, blur control mechanism 5 controls removal drive mechanism 54, and sliding pin 55a of removal regulation member 55 is driven to the withdrawal position. As a result, the removal of exchange lens 1 from camera body 2 becomes possible.

According to the present embodiment of the present invention, since exchange lens 1 cannot be removed from camera body 2 unless there is a locked state where the movement of blur correcting lens group L3 is restricted, it is possible to raise the reliability of the camera. Moreover, improved photographic performance can be obtained if the restriction position of the blur correcting lens group L3 is positioned on the optical axis I compared to a restriction position set at a position separated from the optical axis I. Even when blur correction is not conducted, problems are minimized if the restriction position is positioned on the optical axis I.

A vibration correction device for a camera of the present embodiments of the present invention comprises a blur detection mechanism 3 which detects the blurring 50 of the camera, a blur correcting lens group L3 which moves at least a part of the photographic optical system, a blur correcting mechanism 4 which drives blur correcting lens group L3, a blur control mechanism 5 which controls the operation of blur correcting mechanism 4 based on output of the blur detection mechanism 3 and conducts blur correction, a locking arm 14 which secures blur correcting lens group L3 in a specified position, and a removal regulation member 23, 31, 41, 55 which regulates the removal of exchange lens 1 from camera body 2. The operation or non-operation of a removal regulation member 23, 31, 41, 55 is made contingent upon changes in status of locking arm 14.

There is no engagement between the removal regulation member 23, 31, 41, 55 and locking arm 14 when blur correction mechanism 4 is set in a locked position (first position 14d) by locking arm 14. Therefore, operation of the removal regulation member is possible and exchange lens 1 can be removed from camera body 2.

The removal regulation member and locking arm 14 are engaged when blur correcting mechanism 4 is set in a lock release state (that is, blur correction mechanism 4 is free to operate unrestricted) by locking arm 14 set in the second position 14e. Therefore, operation of the removal regulation member 23, 31, 41, 55 is restricted and exchange lens 1 cannot be removed from camera body 3. Since the removal regulation member 23, 31, 41, 55 can operate and exchange lens 1 can be removed from camera body 2 only when the blur correcting mechanism 4 is in a locked state, the danger of inadvertent movement of blur correcting lens group L3 is eliminated.

Although a few preferred embodiments of the invention have been shown and described, it will be appreciated by those skilled in the art that changes may be made in these embodiments, without departing from the principles and the spirit of the invention, the scope of which is defined in the claims and their equivalents.

What is claimed is:

1. A camera comprising:

a camera body;

a photographic optical system which includes a blur correction lens and is detachable from the camera body;

a blur correction mechanism which compensates for blur by moving the blur correction lens;

a locking mechanism which has a first position that restricts movement of the blur correction lens, and a second position which allows the blur correction lens to move unrestricted by the locking mechanism;

a removal regulation member which regulates the detachment of the photographic optical system from the camera body, wherein the operation of the removal regulation member is conditional upon the position of the locking mechanism; and a lens holder which holds the blur correction lens, the lens holder having a hole, wherein the removal regulation member includes a notched part, and the locking mechanism comprises an arm having a first end with a protrusion and a second end with a protrusion and moves so that, when the locking mechanism is in the first position, the protrusion of the first end fits into the hole of the lens holder to restrict movement of the blur correction lens and the protrusion of the second end is not fitted into the notched part of the removal regulation member and, when the locking mechanism is in the second position, the protrusion of the first end is not fitted into the hole of the lens holder and the protrusion of the second end is fitted into the notched part of the removal regulation member to restrict the movement of the removal regulation member.

2. A camera as in claim 1, wherein the removal regulation member is U-shaped.

3. A camera as in claim 1, wherein the removal regulation member is L-shaped.

4. A camera comprising:

a camera body;

a photographic optical system which includes a blur correction lens and is detachable from the camera body;

a blur correction mechanism which compensates for blur by moving the blur correction lens;

a locking mechanism which has a first position that restricts movement of the blur correction lens, and a second position which allows the blur correction lens to move unrestricted by the locking mechanism;

a removal regulation member which regulates the detachment of the photographic optical system from the camera body, wherein the operation of the removal regulation member is conditional upon the position of the locking mechanism;

an operation member which operates as a switch having a position A and a position B;

a lock discriminating mechanism which determines whether the locking mechanism is in the first position or the second position; and a removal regulation member drive mechanism which drives the removal regulation member, wherein when the operation member is in position A, the lock discriminating mechanism determines whether the locking mechanism is in the first position or the second position and, when the locking mechanism is in the first position, the removal regulation member is driven by the removal regulation member drive mechanism to allow the photographic optical system to be removed from the camera body and, when the locking mechanism is in the second position, the removal regulation member is maintained in a position which does not allow the photographic optical system to be removed from the camera body, and when the operation member is in position B, the removal regulation member is not driven by the removal regulation member drive mechanism.

5. A camera comprising:

a camera body;

a photographic optical system which includes a blur correction lens and is detachable from the camera body;

a blur correction mechanism which compensates for blur by moving the blur correction lens;

a locking mechanism which has a first position that restricts movement of the blur correction lens, and a second position which allows the blur correction lens to move unrestricted by the locking mechanism;

a removal regulation member which regulates the detachment of the photographic optical system from the camera body wherein the operation of the removal regulation member is conditional upon the position of the locking mechanism; and a lens holder which holds the blur correction lens, the lens holder having a hole, wherein the removal regulation member allows detachment of the photographic optical system from the camera body when the locking mechanism is in the first position and the removal regulation member does not allow detachment of the photographic optical system from the camera body when the locking mechanism is in the second position, the removal regulation member includes a notched part, and the locking mechanism comprises an arm having a first end with a protrusion and a second end with a protrusion and moves so that, when the locking mechanism is in the first position, the protrusion of the first end fits into the hole of the lens holder to restrict movement of the blur correction lens and the protrusion of the second end is not fitted into the notched part of the removal regulation member and, when the locking mechanism is in the second position, the protrusion of the first end is not fitted into the hole of the lens holder and the protrusion of the second end is fitted into the notched part of the removal regulation member to restrict the movement of the removal regulation member.

6. A camera as in claim 5, wherein the removal regulation member is U-shaped.

7. A camera as in claim 5, wherein the removal regulation member is L-shaped.

8. A camera comprising:

a camera body;

a photographic optical system which includes a blur correction lens and is detachable from the camera body;

a blur correction mechanism which compensates for blur by moving the blur correction lens;

a locking mechanism which has a first position that restricts movement of the blur correction lens, and a second position which allows the blur correction lens to move unrestricted by the locking mechanism;

a removal regulation member which regulates the detachment of the photographic optical system from the camera body, wherein the operation of the removal regulation member is conditional upon the position of the locking mechanism;

an operation member which operates as a switch having a position A and a position B;

a lock discriminating mechanism which determines whether the locking mechanism is in the first position or the second position; and a removal regulation member drive mechanism which drives the removal regulation member, wherein the removal regulation member allows detachment of the photographic optical system from the camera body when the locking mechanism is in the first position and the removal regulation member does not allow detachment of the photographic optical system from the camera body when the locking mechanism is in the second position, when the operation member is in position A, the lock discriminating mechanism determines whether the locking mechanism is in the first position or the second position and, when the locking mechanism is in the first position, the removal regulation member is driven by the removal regulation member drive mechanism to allow the photographic optical system to be removed from the camera body and, when the locking mechanism is in the second position, the removal regulation member is maintained in a position which does not allow the photographic optical system to be removed from the camera body, and when the operation member is in position B, the removal regulation member is not driven by the removal regulation member drive mechanism.

9. A camera comprising:

a camera body a photographic optical system which includes a blur correction lens and is detachable from the camera body;

a detection mechanism for detecting blur;

a blur correction lens movement mechanism which moves the blur correction lens;

a blur control unit which controls the operation of the blur correction lens movement mechanism based on blur detected by the detection mechanism;

a locking mechanism which has a first position that secures the blur correction lens in a specified position and a second position which does not secure the blur correction lens;

a removal regulation member which operates to regulate the detachment of the photographic optical system from the camera body, wherein the operation of the removal regulation member is conditional upon the position of the locking mechanism; and a lens holder which holds the blur correction lens, the lens holder having a hole, wherein the removal regulation member includes a notched part, and the locking mechanism comprises an arm having a first end with a protrusion and a second end with a protrusion and moves so that, when the locking mechanism is in the first position, the protrusion of the first end fits into the hole of the lens holder to restrict movement of the blur correction lens and the protrusion of the second end is not fitted into the notched part of the removal regulation member and, when the locking mechanism is in the second position, the protrusion of the first end is not fitted into the hole of the lens holder and the protrusion of the second end is fitted into the notched part of the removal regulation member to restrict the movement of the removal regulation member.

10. A camera as in claim 9, wherein the removal regulation member is U-shaped.

11. A camera as in claim 9, wherein the removal regulation member is L-shaped.

12. A camera comprising:

a camera body;

a photographic optical system which includes a blur correction lens and is detachable from the camera body;

a detection mechanism for detecting blur;

a blur correction lens movement mechanism which moves the blur correction lens;

a blur control unit which controls the operation of the blur correction lens movement mechanism based on blur detected by the detection mechanism;

a locking mechanism which has a first position that secures the blur correction lens in a specified position and a second position which does not secure the blur correction lens;

a removal regulation member which operates to regulate the detachment of the photographic optical system from the camera body, wherein the operation of the removal regulation member is conditional upon the position of the locking mechanism;

an operation member which operates as a switch having a position A and a position B;

a lock discriminating mechanism which determines whether the locking mechanism is in the first position or the second position; and a removal regulation member drive mechanism which drives the removal regulation member, wherein when the operation member is in position A, the lock discriminating mechanism determines whether the locking mechanism is in the first position or the second position and, when the locking mechanism is in the first position, the removal regulation member is driven by the removal regulation member drive mechanism to allow the photographic optical system to be removed from the camera body and, when the locking mechanism is in the second position, the removal regulation member is maintained in a position which does not allow the photographic optical system to be removed from the camera body, and when the operation member is in position B, the removal regulation member is not driven by the removal regulation member drive mechanism.

13. A camera comprising:

a camera body;

a photographic optical system which includes a blur correction lens and is detachable from the camera body;

a detection mechanism for detecting blur;

a blur correction lens movement mechanism which moves the blur correction lens;

a blur control unit which controls the operation of the blur correction lens movement mechanism based on blur detected by the detection mechanism;

a locking mechanism which has a first position that secures the blur correction lens in a specified position and a second position which does not secure the blur correction lens;

a removal regulation member which operates to regulate the detachment of the photographic optical system from the camera body, wherein the operation of the removal regulation member is conditional upon the position of the locking mechanism; and a lens holder which holds the blur correction lens, the lens holder having a hole, wherein the removal regulation member allows detachment of the photographic optical system from the camera body when the locking mechanism is in the first position and the removal regulation member does not allow detachment of the photographic optical system from the camera body when the locking mechanism is in the second position, the removal regulation member includes a notched part, and the locking mechanism comprises an arm having a first end with a protrusion and a second end with a protrusion and moves so that, when the locking mechanism is in the first position, the protrusion of the first end fits into the hole of the lens holder to restrict movement of the blur correction lens and the protrusion of the second end is not fitted into the notched part of the removal regulation member and, when the locking mechanism is in the second position, the protrusion of the first end is not fitted into the hole of the lens holder and the protrusion of the second end is fitted into the notched part of the removal regulation member to restrict the movement of the removal regulation member.

14. A camera as in claim 13, wherein the removal regulation member is U-shaped.

15. A camera as in claim 13, wherein the removal regulation member is L-shaped.

16. A camera comprising:

a camera body;

a photographic optical system which includes a blur correction lens and is detachable from the camera body;

a detection mechanism for detecting blur;

a blur correction lens movement mechanism which moves the blur correction lens;

a blur control unit which controls the operation of the blur correction lens movement mechanism based on blur detected by the detection mechanism;

a locking mechanism which has a first position that secures the blur correction lens in a specified position and a second position which does not secure the blur correction lens;

a removal regulation member which operates to regulate the detachment of the photographic optical system from the camera body, wherein the operation of the removal regulation member is conditional upon the position of the locking mechanism;

an operation member which operates as a switch having a position A and a position B;

a lock discriminating mechanism which determines whether the locking mechanism is in the first position or the second position; and a removal regulation member drive mechanism which drives the removal regulation member, wherein the removal regulation member allows detachment of the photographic optical system from the camera body when the locking mechanism is in the first position and the removal regulation member does not allow detachment of the photographic optical system from the camera body when the locking mechanism is in the second position, when the operation member is in position A, the lock discriminating mechanism determines whether the locking mechanism is in the first position or the second position and, when the locking mechanism is in the first position, the removal regulation member is driven by the removal regulation member drive mechanism to allow the photographic optical system to be removed from the camera body and, when the locking mechanism is in the second position, the removal regulation member is maintained in a position which does not allow the photographic optical system to be removed from the camera body, and when the operation member is in position B, the removal regulation member is not driven by the removal regulation member drive mechanism.

* * * * *